(12) United States Patent
Werner

(10) Patent No.: US 11,596,912 B2
(45) Date of Patent: *Mar. 7, 2023

(54) SINGLE STAGE CLARIFIER AND MIXING ASSEMBLY

(71) Applicant: University of Kentucky Research Foundation, Lexington, KY (US)

(72) Inventor: Joshua Michael Werner, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/095,260

(22) Filed: Nov. 11, 2020

(65) Prior Publication Data

US 2021/0205771 A1 Jul. 8, 2021

Related U.S. Application Data

(63) Continuation-in-part of application No. 16/937,032, filed on Jul. 23, 2020, now Pat. No. 11,207,614.
(Continued)

(51) Int. Cl.
*B01D 21/08* (2006.01)
*B01F 33/81* (2022.01)
(Continued)

(52) U.S. Cl.
CPC ........ *B01F 33/811* (2022.01); *B01D 17/0217* (2013.01); *B01D 21/0045* (2013.01);
(Continued)

(58) Field of Classification Search
CPC ............ B01D 21/0042; B01D 21/0045; B01D 21/0057; B01D 21/0087; B01D 21/08;
(Continued)

(56) References Cited

U.S. PATENT DOCUMENTS 1,701,068 A 2/1929 Flowers
2,419,004 A 4/1947 Biecker et al.
(Continued)

FOREIGN PATENT DOCUMENTS

CA 2349048 A1 11/2002
DE 4401576 A1 7/1995
(Continued)

OTHER PUBLICATIONS

English Machine Translation of CA2349048A1 dated Nov. 14, 2002.
English Machine Translation of EP0434484A1 dated Jun. 26, 1991.
English Machine Translation of DE4401576A1 dated Apr. 21, 2021.

*Primary Examiner* — Christopher Upton
(74) *Attorney, Agent, or Firm* — Stites & Harbison PLLC; Warren D. Schickli

(57) ABSTRACT

A single stage clarifier and mixing assembly includes a housing, a mixing section within the housing and a clarifier section within the housing. The mixing section includes a mixing chamber having (a) an inlet, adapted for delivering an inlet stream to the mixing chamber, at an upper end, and (b) a mixing section outlet at a lower end. The clarifier section extends concentrically around the mixing section. The single stage clarifier and mixing assembly also includes an agitator adapted for mixing the inlet stream in the mixing chamber.

15 Claims, 10 Drawing Sheets

Related U.S. Application Data

(60) Provisional application No. 62/877,389, filed on Jul. 23, 2019.

(51) Int. Cl.

| | | |
|---|---|---|
| *B01D 17/02* | (2006.01) | |
| *B01D 21/00* | (2006.01) | |
| *B01F 27/86* | (2022.01) | |
| *B01F 27/91* | (2022.01) | |
| *B01F 27/113* | (2022.01) | |
| *B01D 21/28* | (2006.01) | |
| *B01D 21/24* | (2006.01) | |

(52) U.S. Cl.
CPC ..... *B01D 21/0057* (2013.01); *B01D 21/0087* (2013.01); *B01D 21/08* (2013.01); *B01D 21/2427* (2013.01); *B01D 21/286* (2013.01); *B01F 27/113* (2022.01); *B01F 27/86* (2022.01); *B01F 27/91* (2022.01)

(58) Field of Classification Search
CPC ................ B01D 21/16; B01D 21/2405; B01D 21/2427; B01D 21/286
USPC .......................... 210/519, 521, 522, 801, 802
See application file for complete search history.

(56) References Cited

U.S. PATENT DOCUMENTS

| | | | |
|---|---|---|---|
| 3,353,676 A | 11/1967 | Hirsch | |
| 3,473,665 A | 10/1969 | Duff | |
| 3,615,025 A | 10/1971 | Rice et al. | |
| 3,635,346 A | 1/1972 | Zuckerman et al. | |
| 3,706,384 A | 12/1972 | Weijman-hane | |
| 4,086,169 A | 4/1978 | Skarheim et al. | |
| 4,110,211 A | 8/1978 | Henrikson | |
| 4,246,111 A | 1/1981 | Savard et al. | |
| 4,303,517 A | 12/1981 | Love et al. | |
| 4,346,005 A | 8/1982 | Zimmerman | |
| 4,351,733 A | 9/1982 | Salzer et al. | |
| 4,416,764 A * | 11/1983 | Gikis | B01D 11/0223 210/519 |
| 4,613,434 A | 9/1986 | Maatta | |
| 4,664,802 A | 5/1987 | Lee | |
| 4,681,683 A | 7/1987 | Lindstol | |
| 4,747,948 A | 5/1988 | North | |
| 4,889,624 A | 12/1989 | Soriente et al. | |
| 5,049,278 A | 9/1991 | Galper | |
| 5,332,312 A | 7/1994 | Evanson | |
| 5,616,241 A | 4/1997 | Khudenko | |
| 5,725,810 A | 3/1998 | Brunner et al. | |
| 5,800,709 A | 9/1998 | Smith | |
| 5,800,717 A | 9/1998 | Ramsay et al. | |
| 5,947,299 A | 9/1999 | Vazquez et al. | |
| 6,540,213 B2 | 4/2003 | Bachmann et al. | |
| 6,773,586 B2 | 8/2004 | Menke et al. | |
| 7,001,525 B2 | 2/2006 | Binot et al. | |
| 8,092,688 B2 | 1/2012 | Sauvignet et al. | |
| 8,168,073 B2 | 5/2012 | Ng et al. | |
| 8,257,592 B2 | 9/2012 | Wiemers et al. | |
| 8,632,685 B2 | 1/2014 | Xu et al. | |
| 8,940,166 B2 | 1/2015 | Wiemers | |
| 9,308,471 B2 | 4/2016 | Poulter et al. | |
| 9,328,499 B2 | 5/2016 | Duncan et al. | |
| 9,415,397 B1 | 8/2016 | Christodoulou | |
| 9,421,554 B2 | 8/2016 | Gardiner et al. | |
| 9,579,659 B2 | 2/2017 | Starr et al. | |
| 9,776,106 B2 | 10/2017 | Charhut et al. | |
| 2008/0314823 A1 | 12/2008 | Kulick et al. | |
| 2011/0114545 A1 | 5/2011 | Hoefken et al. | |
| 2015/0068969 A1 | 3/2015 | Stagg et al. | |
| 2017/0165594 A1 | 6/2017 | Pazan | |
| 2018/0117503 A1 | 5/2018 | Ross et al. | |
| 2021/0023478 A1 * | 1/2021 | Werner | B01D 21/0042 |

FOREIGN PATENT DOCUMENTS

| | | |
|---|---|---|
| EP | 0434484 A1 | 6/1991 |
| WO | 8605412 A1 | 9/1986 |
| WO | 9735655 A1 | 10/1997 |
| WO | 2004108608 A1 | 12/2004 |

\* cited by examiner

SINGLE STAGE CLARIFIER AND MIXING ASSEMBLY

RELATED APPLICATION

This application is a continuation-in-part of prior U.S. patent application Ser. No. 16/937,032 filed on Jul. 23, 2020 which claims the benefit of U.S. Provisional Patent Application Ser. No. 62/877,389 filed on Jul. 23, 2019. The full disclosure of Ser. Nos. 16/937,032 and 62/877,389 are hereby incorporated by reference in their entirety.

GOVERNMENT SUPPORT

This invention was made with government support under Grant No. DE-FE0027035 awarded by the U.S. Department of Energy. The government has certain rights in the invention.

TECHNICAL FIELD

This document relates generally to an apparatus adapted for multiple applications including leaching, adsorption and clarification.

BACKGROUND

Clarifiers that rely upon gravity sedimentation to remove particles from a slurry are well known in the art. Particle settling occurs when the settling velocity is greater than the upward fluid velocity. The settling velocities are determined by a ratio of gravity forces to drag forces and are directly proportional to the cross-section of the particle.

This document relates to a new and improved apparatus comprising a single stage clarifier and mixing assembly.

SUMMARY

In accordance with the purposes and benefits set forth herein, a new and improved apparatus is provided. That apparatus comprises a first single stage clarifier and mixing assembly. That single stage clarifier and mixing assembly includes: (a) a housing, (b) a mixing section within the housing, the mixing section including a mixing chamber having an inlet, adapted for delivering an inlet stream to the mixing chamber, at an upper end and a mixing section outlet at a lower end, (c) a clarifier section within the housing and extending concentrically around the mixing section and (d) an agitator adapted for mixing the inlet stream in the mixing chamber.

In one or more of the many possible embodiments of the apparatus, the clarifier section includes a plurality of plates that are nested together and define a plurality of intervening flow passageways wherein lowermost ends of the plurality of intervening flow passageways open into an axial passageway extending through the clarifier section along and concentrically around the mixing section.

In one or more of the many possible embodiments of the apparatus, the agitator includes a drive shaft and an impeller carried on the drive shaft.

In one or more of the many possible embodiments of the apparatus, the mixing section includes a cylindrical outer wall.

In one or more of the many possible embodiments of the apparatus, the apparatus further includes a cylindrical baffle spaced inside the outer wall.

In one or more of the many possible embodiments of the apparatus, the mixing section outlet is provided in a bottom wall of the mixing section.

In one or more of the many possible embodiments of the apparatus, the mixing section outlet further includes an opening in the bottom wall aligned with the drive shaft along a central axis of the housing.

In one or more of the many possible embodiments of the apparatus, the uppermost ends of the plurality of intervening flow passageways open into a clarified liquid chamber overlying the uppermost ends.

In one or more of the many possible embodiments of the apparatus, the clarified liquid chamber is in communication with a first outlet.

In one or more of the many possible embodiments of the apparatus, the housing is substantially frustoconical in shape and the first outlet for a first outlet stream is provided at a top end thereof while a second outlet for a second outlet stream is provided at a bottom end thereof.

In one or more of the many possible embodiments of the apparatus, the uppermost ends of the plurality of intervening flow passageways open into a clarified liquid chamber extending concentrically around the apparatus between the plurality of frustoconical plates and the housing. In such an embodiment, the clarified liquid chamber is in communication with a first outlet for the clarified liquid. Further, the housing may be at least partially frustoconical in shape and the first outlet for a first outlet stream may be provided at a top end thereof while a second outlet for a second outlet slurry stream may be provided at a bottom end thereof. Here, it should be appreciated that those skilled in the art will recognize that there are a multiplicity of methods to provide an outlet or an outlet overflow weir. Thus, in another embodiment, the outlet may be exterior of the housing.

In one or more of the many possible embodiments of the apparatus, the apparatus further includes a second single stage clarifier and mixing assembly having a structure identical to the first single stage clarifier and mixing assembly.

In one or more of the many possible embodiments of the apparatus, the apparatus further includes a third single stage clarifier and mixing assembly having a structure identical to the first single stage clarifier and mixing assembly.

In such an embodiment, (a) a first outlet stream from a first outlet of said second single stage clarifier and mixing assembly may be delivered through the inlet to the mixing chamber of the first single stage clarifier and mixing assembly and (b) a first outlet stream from a first outlet of said third single stage clarifier and mixing assembly may be delivered through an inlet to the mixing chamber of said second single stage clarifier and mixing assembly. Further, (c) the second outlet stream from the second outlet of the first single stage clarifier and mixing assembly may be delivered through the inlet to said mixing chamber of said second single stage clarifier and mixing assembly and (d) a second outlet stream from a second outlet of the second single stage clarifier and mixing assembly may be delivered through the inlet to said mixing chamber of said third single stage clarifier and mixing assembly. This maintains a countercurrent flow of slurry and clarified liquid through the system of clarifier and mixing assemblies. Of course, those skilled in the art may achieve a multiplicity of stages and this embodiment is illustrative, not restrictive.

In the following description, there are shown and described several preferred embodiments of the apparatus. As it should be realized, the apparatus is capable of other, different embodiments and its several details are capable of modification in various, obvious aspects all without departing from apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the method and together with the description serve to explain certain principles thereof.

Reference will now be made in detail to the present preferred embodiments of the apparatus, examples of which are illustrated in the accompanying drawing figures.

DETAILED DESCRIPTION

Figure 1:
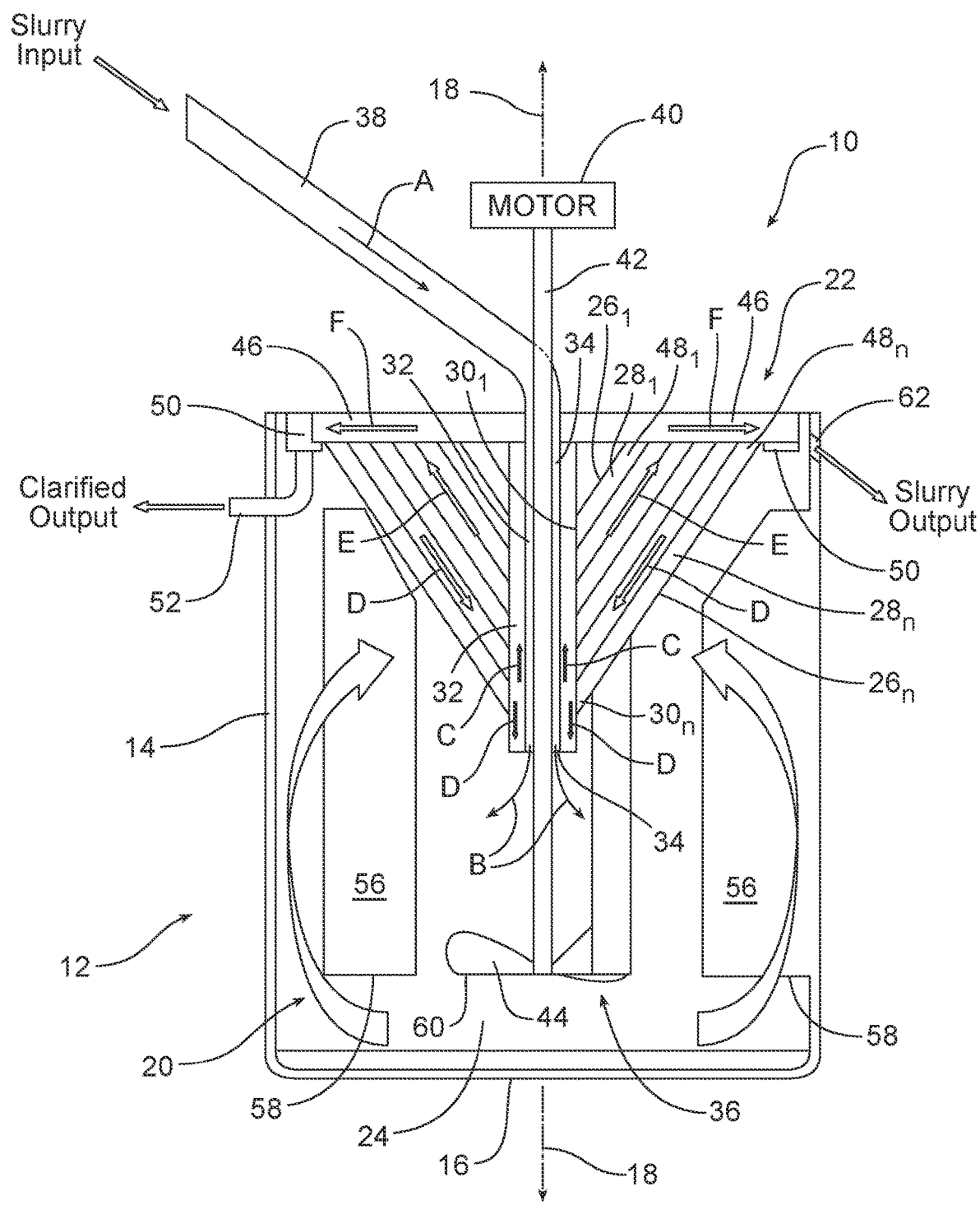
FIG. 1 is a schematic cross-sectional view of a first possible embodiment of the apparatus.
Figure 2:
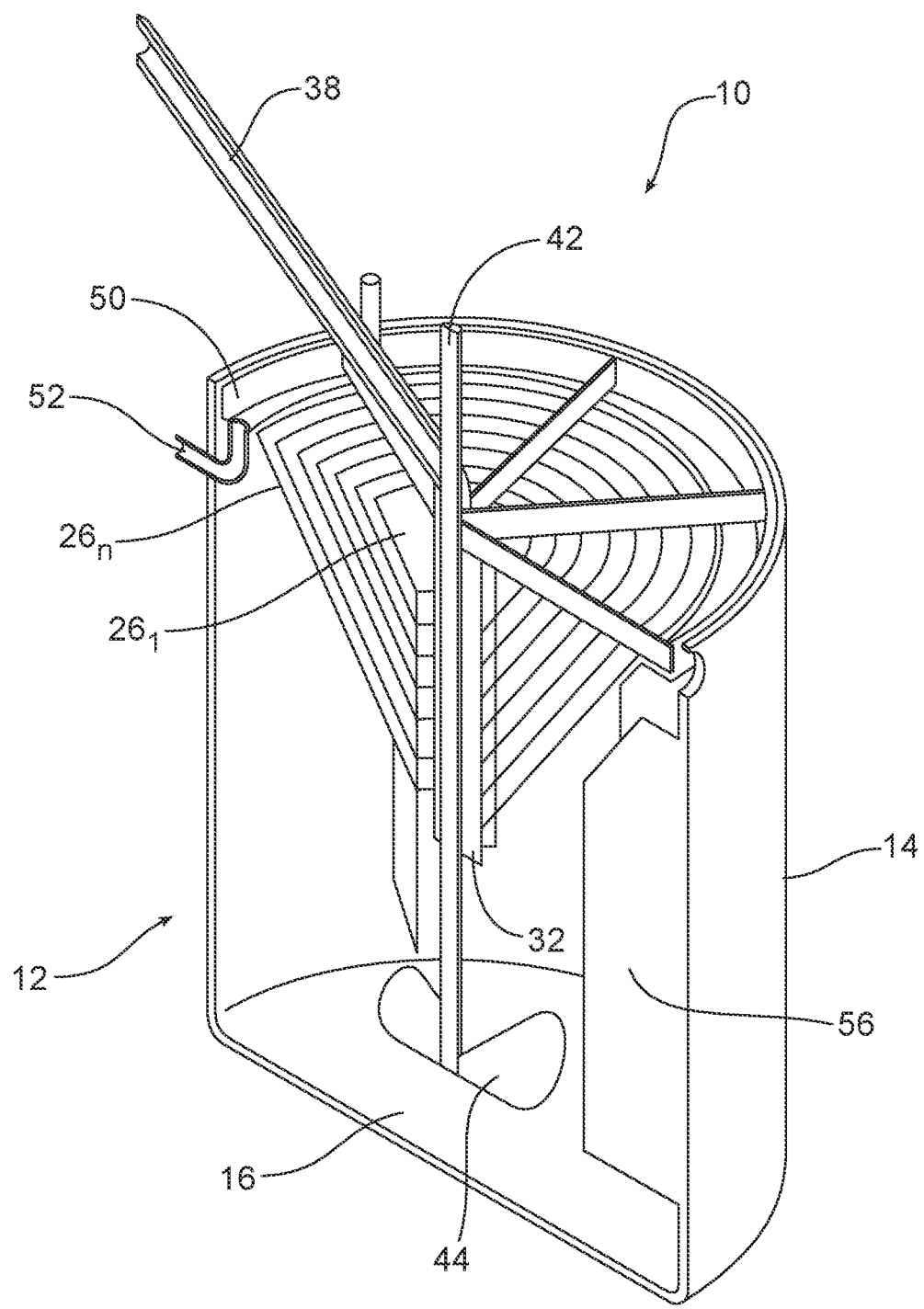
FIG. 2 is a perspective view of the cross-sectioned apparatus illustrated in FIG. 1.

Reference is now made to FIGS. 1 and 2 illustrating a first possible embodiment of an apparatus adapted for leaching, adsorption and clarification applications, including, for example, separating leachate from a slurry. The apparatus comprises a single stage clarifier and mixing assembly 10. As illustrated, the single stage clarifier and mixing assembly 10 includes a housing, generally designated by reference numeral 12, having a circular sidewall 14, a bottom wall 16 and a center axis 18. The single stage clarifier mixing assembly 10 also includes a mixing section 20 and a clarifier section 22 both held within the housing 12. More particularly, the mixing section 20 includes a mixing chamber 24 within the circular sidewall 14 and adjacent the bottom wall 16.

The clarifier section 22 overlies and is axially aligned with the mixing section 20 along the center axis 18 within the housing 12. As illustrated, the clarifier section 22 includes a plurality of plates $26_1$-$26_n$ that are nested together and define a plurality of intervening flow passageways $28_1$-$28_n$. In the illustrated embodiment, the plates $26_1$-$26_n$ are frustoconical in shape. Such a shape may be approximated by interconnecting a series of flat plates if desired. The lowermost ends $30_1$-$30_n$ of the respecting intervening flow passageways $28_1$-$28_n$ open into an axial passageway 32 that extends through the clarifier section 22 along and concentrically around the center axis 18.

The single stage clarifier mixing assembly 10 also includes an inlet 34 adapted for delivering an inlet stream to the mixing section 20 and, more particularly, the mixing chamber 24. For purposes of this document, the terminology "inlet stream" refers to a liquid or slurry to be processed through the mixing assembly.

The single stage clarifier mixing assembly 10 also includes an agitator, generally designated by reference numeral 36, that is adapted to mixing the inlet stream in the mixing chamber 24. The single stage clarifier mixing assembly 10 also includes an inlet stream feed conduit 38 that extends along the center axis 18 through the axial passageway 32 to the inlet 34. As will be described in greater detail below, the inlet stream is fed through the feed conduit 38 to the inlet 34 where that inlet stream is delivered to the mixing chamber 24 of the mixing section 20.

The agitator 36 of the illustrated embodiment includes a drive motor 40 connected by a drive shaft 42 to an impeller 44 which, in the illustrated embodiment, is provided at the distal end of the drive shaft. As illustrated, the drive shaft 42 extends along the center axis 18 through the feed conduit 38 and the inlet 34. Thus, it should be appreciated that the feed conduit 38 and inlet 34 are concentrically disposed around the drive shaft 42; the axial passageway 32 is concentrically disposed about the feed conduit 38 and the inlet 34; and the lowermost ends $30_1$-$30_n$ of the respective intervening flow passageways $28_1$-$28_n$ and the lowermost ends of the frustoconical plates $26_1$-$26_n$ are concentrically disposed about the axial passageway 32.

As further illustrated in FIGS. 1 and 2, the clarifier section 22 also includes a clarified liquid chamber 46 overlying the uppermost ends $48_1$-$48_n$ of the intervening flow passageways $28_1$-$28_n$ as well as the uppermost ends of the frustoconical plates $26_1$-$26_n$. As should be appreciated, the uppermost ends $48_1$-$48_n$ of the intervening flow passageways $28_1$-$28_n$ open into the clarified liquid chamber 46.

The clarifier section 22 also includes a clarified liquid flow gutter 50 (i.e. overflow weir) that extends concentrically around the clarifier liquid chamber 46 and functions to feed clarified leachate to the first outlet 52 that extends from the bottom wall of the clarified liquid flow gutter 50 through the circular sidewall 14 of the housing 12. A first outlet stream is discharged from the first outlet. Depending upon the particular application, the "first outlet stream" may comprise a clarified liquid, a clarified leachate, or clarified barren solution.

As still further shown in FIGS. 1 and 2, the mixing section 20 includes a plurality of baffles or vanes 56 extending radially inwardly from the circular sidewall 14 toward the agitator 36 and, more particularly, the impeller 44. Those vanes 56 may be positioned at angularly spaced positions such as, for example, every 60 degrees. As further illustrated in FIGS. 1 and 2, the bottoms 58 of the vanes 56 may be provided at the same height as the bottom 60 of the impeller 44 from the bottom wall 16. The baffles or vanes 56 prevent the solution from spinning so as to promote agitation and mixing.

In addition, the mixing section 20 includes a second outlet 62 provided in circular sidewall 14 outboard of the clarifier section 22 at a vertical position substantially corresponding to the clarified liquid flow gutter 50: that is, substantially corresponding to the top of the frustoconical plates $26_1$-$28_n$. A second outlet stream is discharged from the second outlet 62. Depending upon the particular application, the second outlet stream may comprise a concentrated-solids slurry or a slurry of the same concentration as the mixing chamber 24.

In operation, an inlet stream, such as a slurry, is delivered to the single stage clarifier mixing assembly 10 by means of the feed conduit 38 (note action arrow A). The inlet stream passing through the feed conduit 38 is discharged from the inlet 34 into the mixing chamber 24 of the mixing section 20 (note action arrows B). The agitator 36 turns with the necessary rotational speed to mix the inlet stream (e.g. slurry) in the mixing chamber 24 and maintain the slurry in suspension. The strongest mixing action is provided at the very bottom of the mixing chamber 24 adjacent the bottom wall 16 below the bottoms 58 of the vanes 56. As the liquid flow is not all exiting via 62, the inlet stream rises in the housing 12, the inlet stream passes through the axial passageway 32 through the lowermost ends $30_1$-$30_n$ and fills the respective intervening flow passageways $28_1$-$28_n$ defined between the frustoconical plates $26_1$-$26_n$ (note action arrows C).

It is in these intervening flow passageways $28_1$-$28_n$ that lamella separation occurs and solids from the inlet stream (e.g. slurry) flow downward (note action arrows D) in the intervening flow passageways $28_1$-$28_n$ on the upper faces of the frustoconical plates $26_1$-$26_n$ under the force of gravity while clarified liquid from the inlet stream flows upward (note action arrows E) and is pushed into the clarified liquid chamber 46 through the uppermost ends $48_1$-$48_n$ of the intervening flow passageways. The resulting clarified liquid (a.k.a. first outlet stream) flows outward (note action arrows F) in the clarified liquid chamber 46 into the clarified liquid flow gutter 50 and is subsequently discharged through the first outlet 52. In contrast, a second outlet stream with concentrated solids is simultaneously forced outward at the top of the mixing chamber 24 through the second outlet 62.

Figure 3:
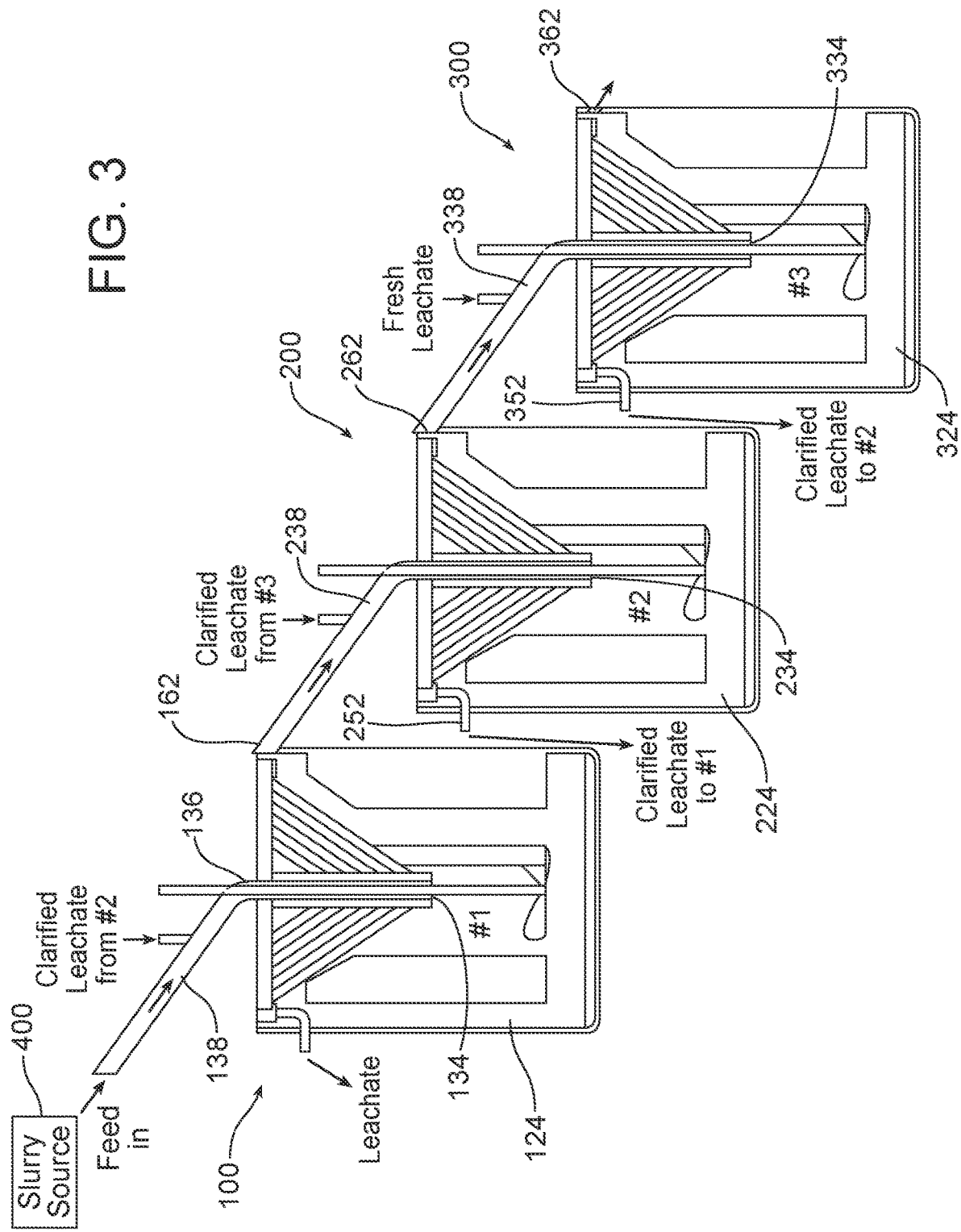
FIG. 3 is a schematic cross-sectional illustration of another possible embodiment of the apparatus incorporating three single stage clarifier mixing assemblies of the type illustrated in FIGS. 1 and 2.

Reference is now made to FIG. 3 illustrating an alternative embodiment of the apparatus incorporating a first single stage clarifier and mixing assembly 100, a second stage clarifier mixing assembly 200 and a third single stage clarifier mixing assembly 300. All three of the mixing assemblies 100, 200, 300 have a structure corresponding to the single stage clarifier and mixing assembly 10 illustrated in FIGS. 1 and 2. Together, the three single stage clarifier mixing assemblies 100, 200, 300 illustrated in FIG. 3 function as a counter-current leaching circuit. As illustrated, the first outlet stream or clarified leachate discharged from the first or clarified leachate outlet 252 of the second single stage clarifier and mixing assembly 200 is delivered to the mixing chamber 124 of the first single stage clarifier mixing assembly 100 through the feed conduit 138 and inlet 134. At the same time, the first outlet stream or clarified leachate from the first or clarified leachate outlet 352 of the third single stage clarifier and mixing assembly 300 is delivered to the mixing chamber 224 of the second single stage clarifier and mixing assembly through the feed conduit 238 and inlet 234.

In addition, the second outlet stream or slurry from the second outlet 162 of the first single stage clarifier mixing assembly 100 is delivered to the mixing chamber 224 of the second single stage clarifier mixing assembly 200 through the feed conduit 238 and the inlet 234 and the second outlet stream or slurry from the second outlet 262 of the second single stage clarifier mixing assembly is delivered to the mixing chamber 324 of the third single stage clarifier mixing assembly 300 through the feed conduit 338 and the inlet 334. Of course, the inlet stream, fresh leachate or unprocessed slurry is also being fed from a source 400 into the mixing chamber 124 of the first single stage clarifier mixing assembly 100 through the feed conduit 38 and inlet 134 while processed slurry being discharged from the outlet 362 of the third single stage clarifier mixing assembly 300 is being discharged from the system.

As should be appreciated, the plurality of frustoconical plates $26_1$-$26_n$ in the various single stage clarifier mixing assemblies 10, 100, 200, 300 are arranged so as to allow for an increase of inter-lamella area as the radius of the plates increases. The effect of this increase in inter-lamella area is that the mean stream velocity of the inlet stream or slurry in the lamella clarifier decreases with increasing radius. As the mean stream velocity of the inlet stream or slurry decreases, the settling efficiency of the solids improves as a function of radius.

While the previous description refers to separations of solid from a slurry it should be appreciated that the single stage clarifier mixing assemblies 10, 100, 200, 300 disclosed above may not only be used in liquid-solid separations, but also for purposes of liquid-liquid separation as well as part of solid-liquid reactors and liquid-liquid reactors.

The plurality of frustoconical plates $26_1$-$26_n$ and the plurality of intervening flow passageways $28_1$-$28_n$ defined between those plates may be oriented at an angle of between 15 and about 60 with respect to the center line axis 18 which extends in a vertical direction. In one particularly useful embodiment, the angle of the plurality of frustoconical plates $26_1$-$26_n$ and plurality of intervening flow passageways $28_1$-$28_n$ is approximately 35 degrees.

Figure 4:
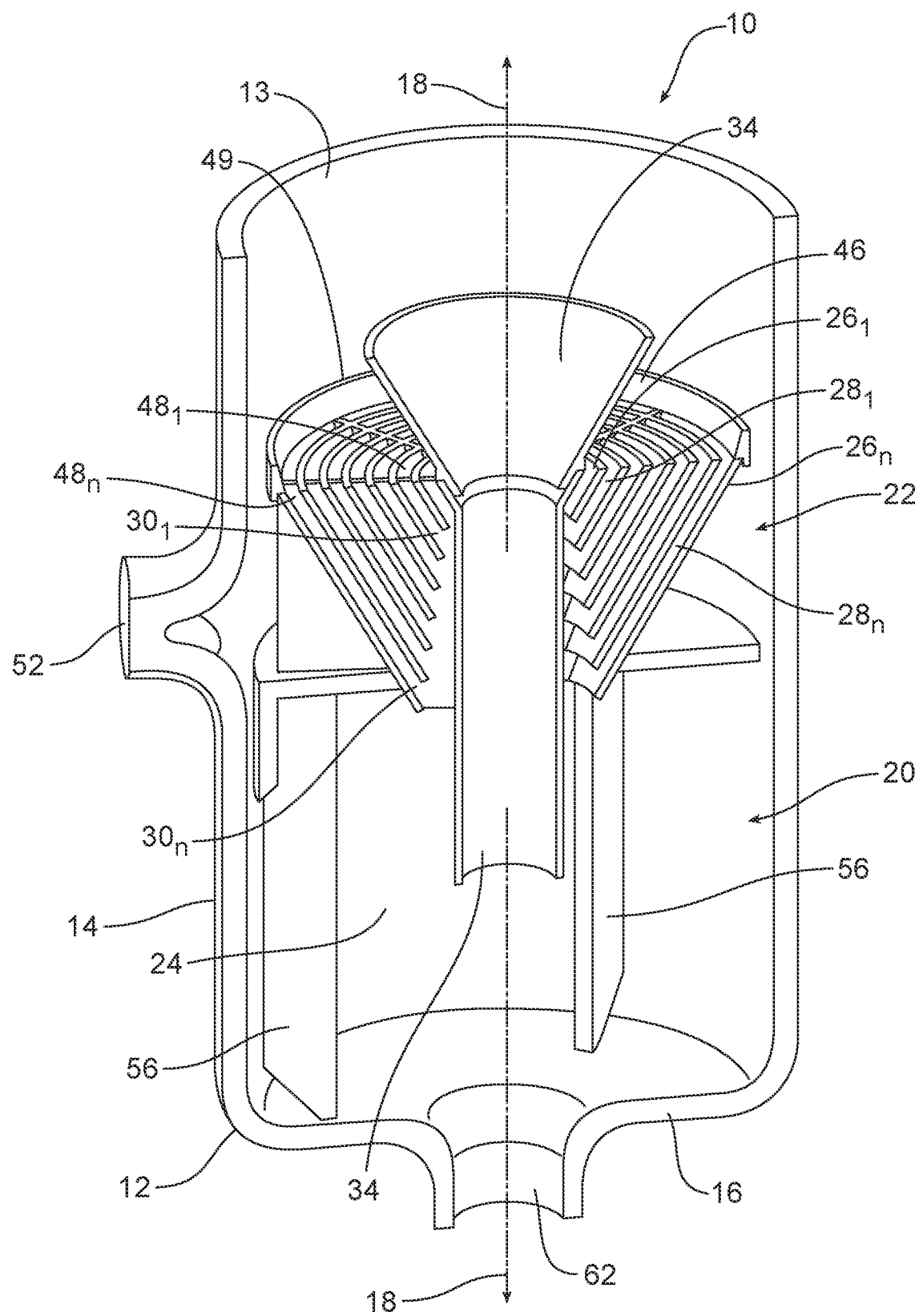
FIG. 4 is a schematic cross-sectional view of an alternative embodiment of the apparatus including a first outlet in a sidewall of the housing and a second outlet in the bottom wall of the housing.

Reference is now made to FIG. 4 which illustrates an alternative embodiment of a single style clarifier and mixing assembly 10.

Reference numbers from the FIG. 1 embodiment replicated in the FIG. 4 embodiment indicate corresponding or analogous elements.

Thus, it should be appreciated that the FIG. 4 embodiment includes a housing 12 having an open top 13, a circular sidewall 14, a bottom wall 16 and a center axis 18. The single stage clarifier and mixing assembly 10 of FIG. 4 also includes a mixing section 20 and a clarifier section 22 both held within the housing.

The clarifier section 22 overlies and is axially aligned with the mixing section 20 along the center axis 18 withing the housing 12. As in the FIG. 1 embodiment, the clarifier section 22 of the FIG. 4 embodiment includes a plurality of frustoconical plates $26_1$-$26_n$ that are nested together and define a plurality of intervening flow passageways $28_1$-$28_n$.

In operation, an inlet stream, such as a slurry, is delivered to the single stage clarifier mixing assembly 10 of FIG. 4 through the open top 13 by means of the inlet 34 into the mixing chamber 24. An agitator (not shown) provides the mixing action to maintain any solids in the mixing chamber in suspension.

As the inlet stream or slurry rises in the housing 12, it passes through the axial passageway 32 through the lowermost ends $30_1$-$30_n$ and fills the respective intervening flow passageways $28_1$-$28_n$. It is there that lamella separation occurs and solids from the inlet stream or slurry flow down toward the outlet 62 in the bottom wall 16.

Simultaneously, the clarified liquid or leachate flows upward from the uppermost ends $48_1$-$48_n$ into the clarified liquid or leachate chamber 46 before flowing over the weir 49 and being discharged from the outlet 52 in the sidewall 14 of the housing 12.

Reference is now made to FIGS. 5A-5D illustrating in cross-section, four additional embodiments of single stage clarifier and mixing assemblies 10. Reference numbers from FIGS. 1 and 3 repeated in FIGS. 5A-5D once again indicate corresponding or analogous elements.

Figure 5A:
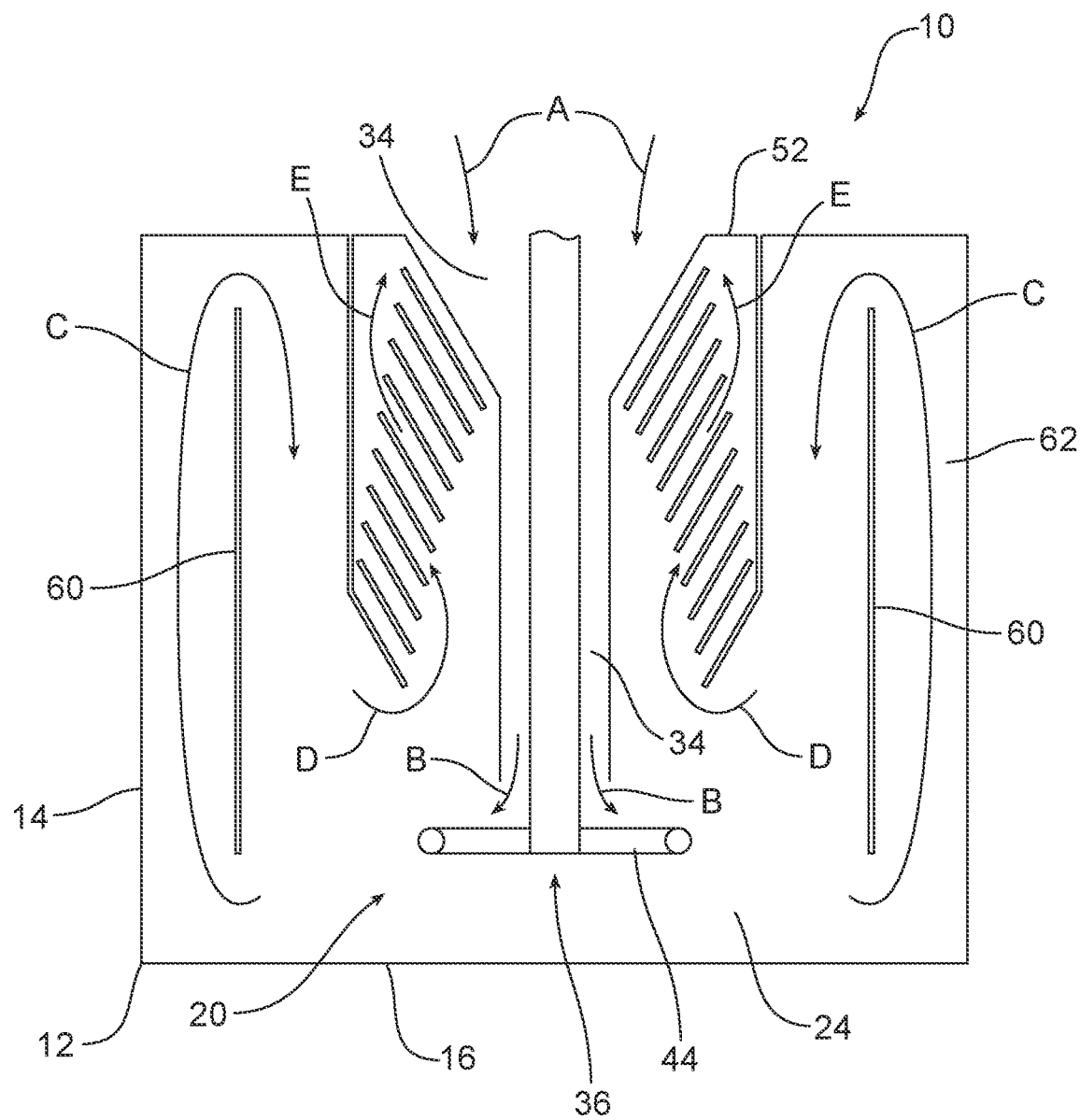
FIGS. 5A-5D illustrate four additional embodiments of the single stage clarifier and mixing assembly in cross-section.

The FIG. 5A embodiment of the mixing assembly 10 differs from the FIGS. 1 and 2 embodiment in a number of respects. The significant difference being the termination of the lamella with regards to the clarification space. In FIG. 5A the clarified liquid exits the lamella and travels vertically for discharge. In FIGS. 1 and 2 the lamella terminates in such a manner where the clarified liquid is conveyed horizontally. Functionally in FIG. 5A the lamella are similar in length with allowances made for the flow velocity in the inlet portion and outlet portion. Hence the near parabolic shape exhibited in FIG. 5A. The housing 12 has a geometry such to allow one to add the inlet stream at the center thereof as illustrated by action arrows A. An alternate embodiment would allow an inlet to the side. That inlet stream flows down the inlet 34 and out into the mixing chamber 24 (see action arrows B).

The mixing chamber 24 may include a cylindrical baffle 60 that extends a full 360 concentrically around the center axis 18 to promote mixing. That baffle 60 forms an outer flow channel 62 with the sidewall 14 of the housing 12. Thus, the inlet stream or slurry is forced outward along the bottom wall 16 by the impeller 44 of the agitator 36 and then rises upward through the flow channel 62 before flowing inward over the top edge of the baffle 60 and then downward through the inner flow channel 64 formed between the baffle and the outer wall 66 of the clarifier section 22 (note action arrows C). In other embodiments, the vertical baffles 56, as shown in FIGS. 1 and 2, may be substituted for or used in conjunction with the cylindrical baffle 60. The two are interchangeable.

The slurry is then forced through the plurality of intervening flow passageways $28_1$-$28_n$ between the plurality of frustoconical plates $26_1$-$26_n$ where lamella separation occurs (see action arrows D). Solids fall downward along the upper surfaces of the plates $26_1$-$26_n$ toward the mixing clamber 24 while clarified liquid or leachate moves upward into the clarified liquid chamber 46 from the uppermost ends of the plates toward the outlet 52 (see action arrow E). As illustrated, that clarified liquid chamber 46 extends concentrically around the plates $26_1$-$26_n$ between the uppermost ends $48_1$-$48_n$ and the outer wall 66 of the clarifier section 22. Further, the annular clarified liquid chamber 46 gradually widens as it rises.

Figure 5B:
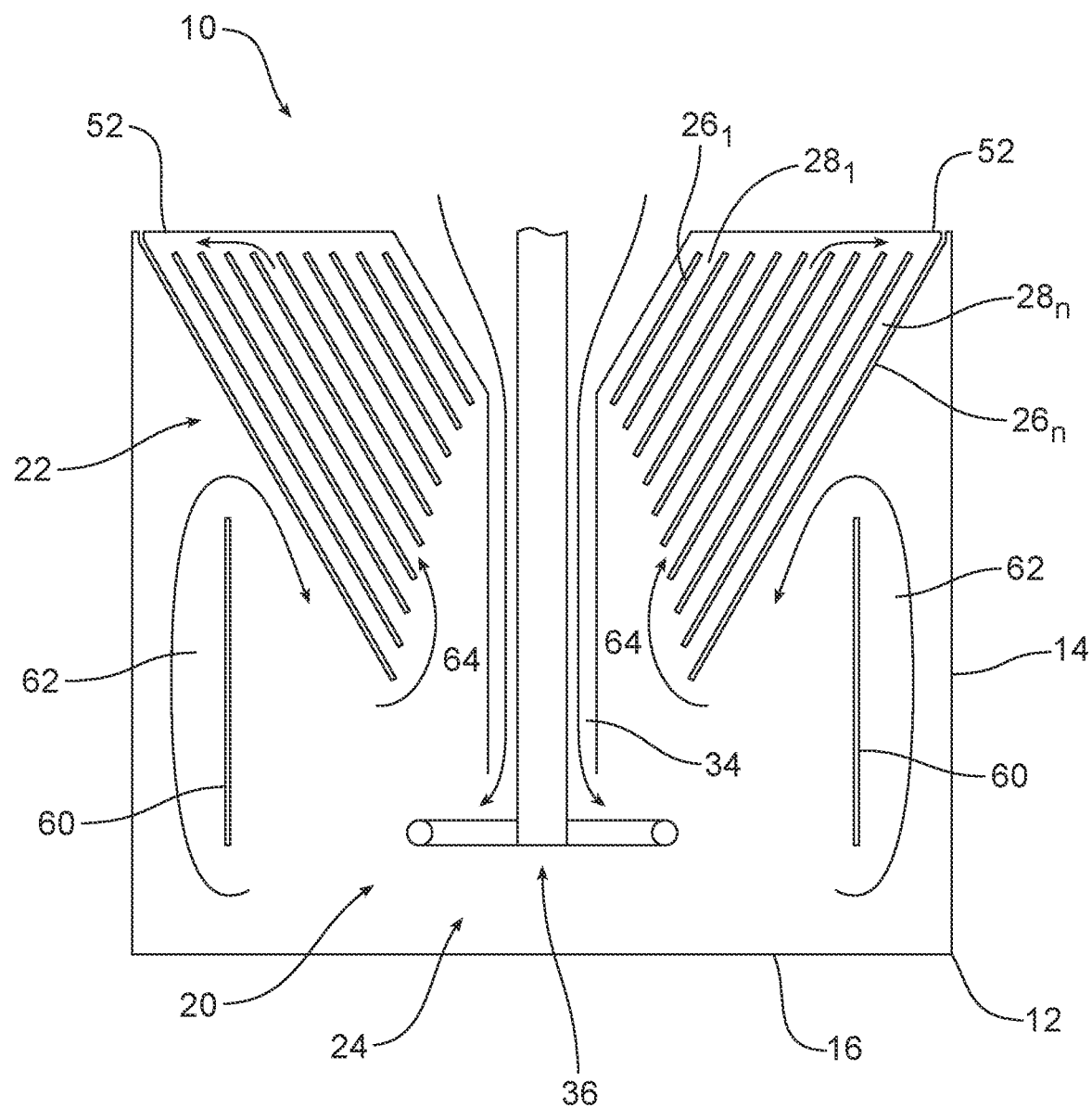

The FIG. 5B embodiment is very similar to the embodiment of FIGS. 1 and 2. The only significant differences are (a) the open top as per the FIG. 5A embodiment, (b) the vanes 56 are substituted for or used in conjunction with the cylindrical baffle 60 and (c) a tapered inner flow channel 64 within the clarifier section 22 to promote more uniform flow velocity into the plates $26_1$-$26_n$. The action arrows A and B illustrate the flow direction of the slurry through the mixing assembly 10 including around the baffle 62 and into the intervening flow passageways $28_1$-$28_n$ formed between the plurality of frustoconical plates $26_1$-$26_n$ providing lamella separation of the solids from the clarified leachate.

Figure 5C:
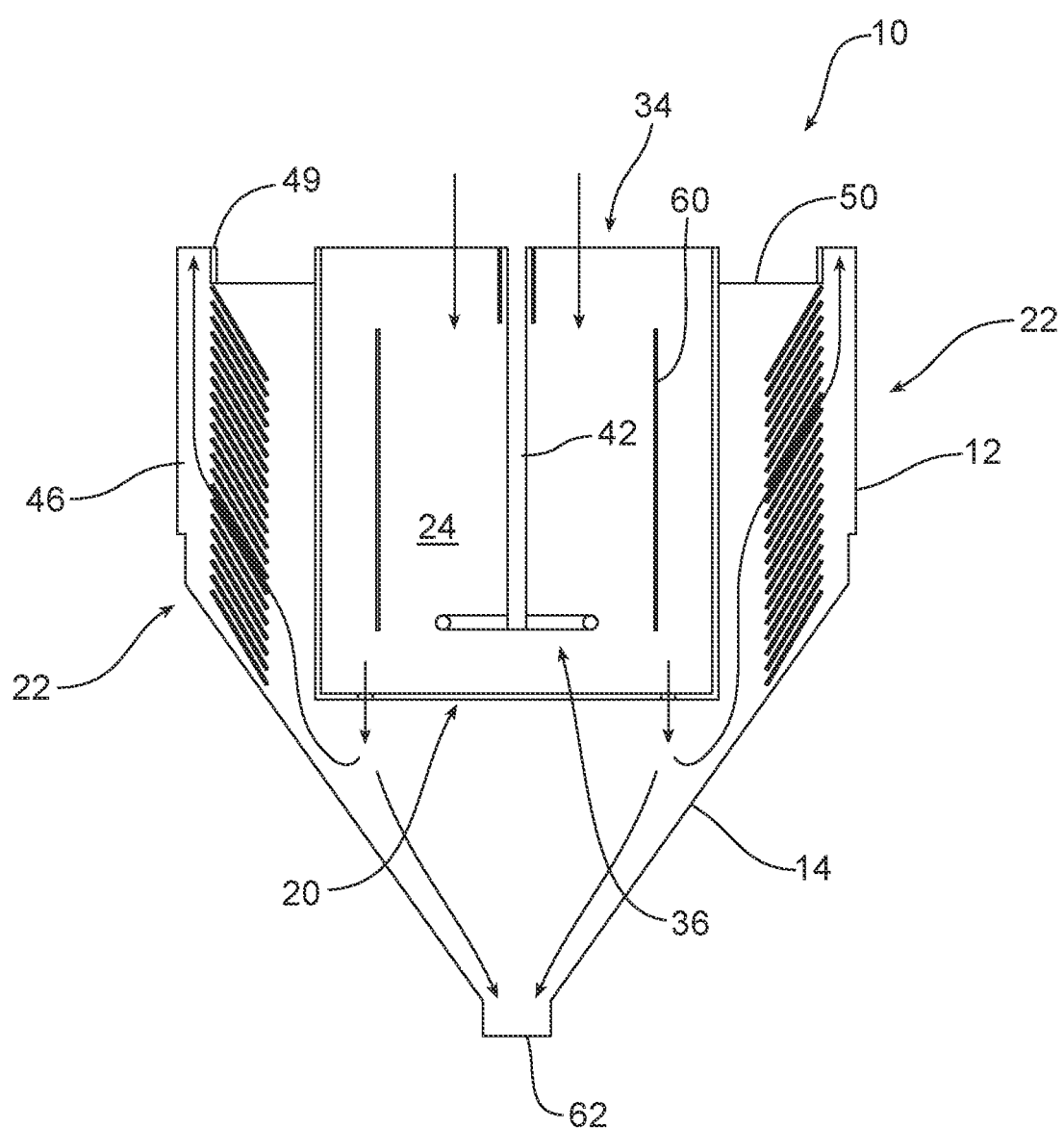
Figure 5D:
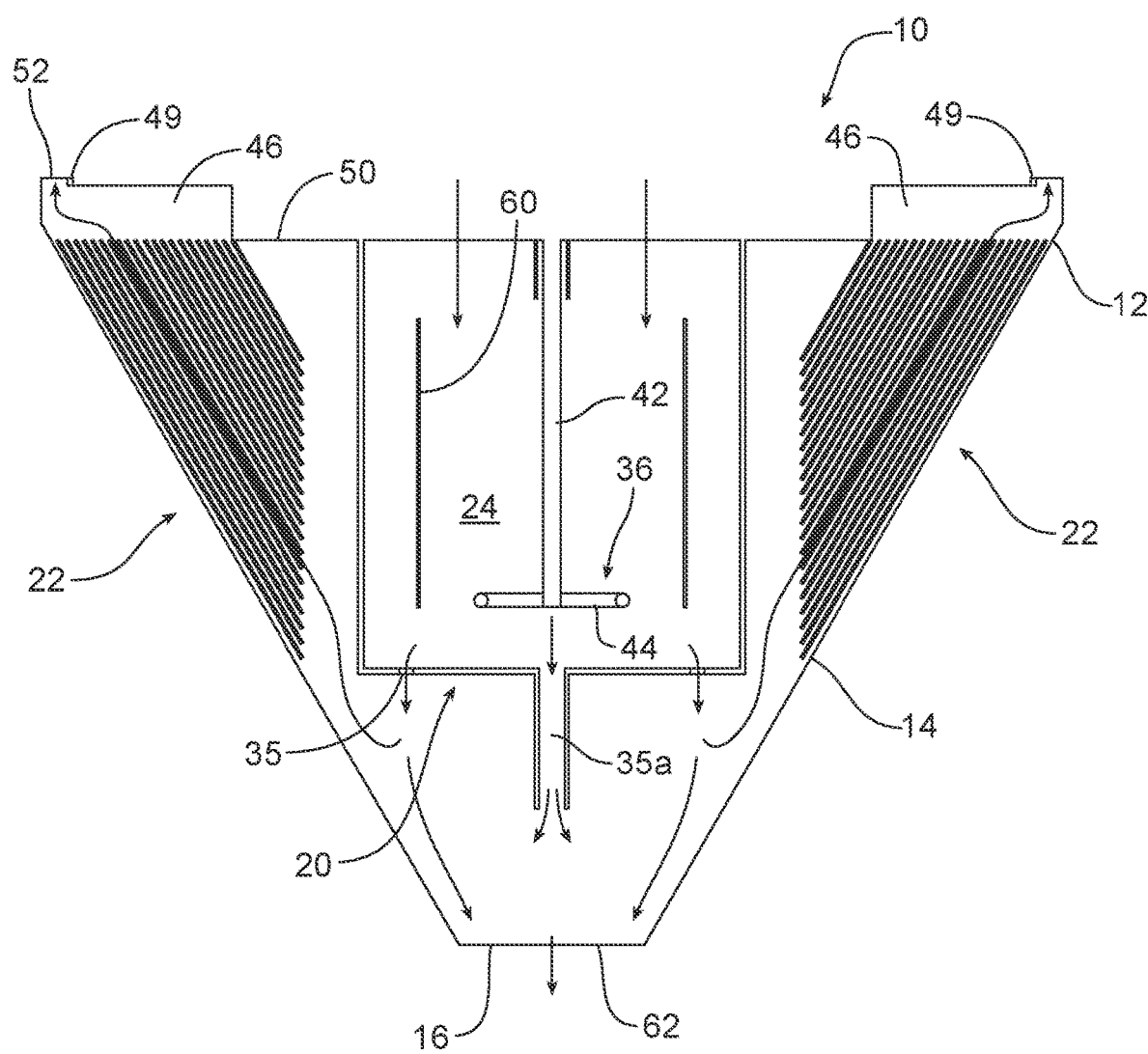

FIGS. 5C and 5D illustrate still other possible embodiments of the mixing assembly 10 wherein the clarifier section 22 is radially arrayed around and concentrically encircles the mixing section 20 which is separated from the settling area via ports 35. The outer wall 14 of the housing 12 also is sloped so as to widen in diameter as it rises: that is, is conical or frustoconical in shape.

Figure 6:
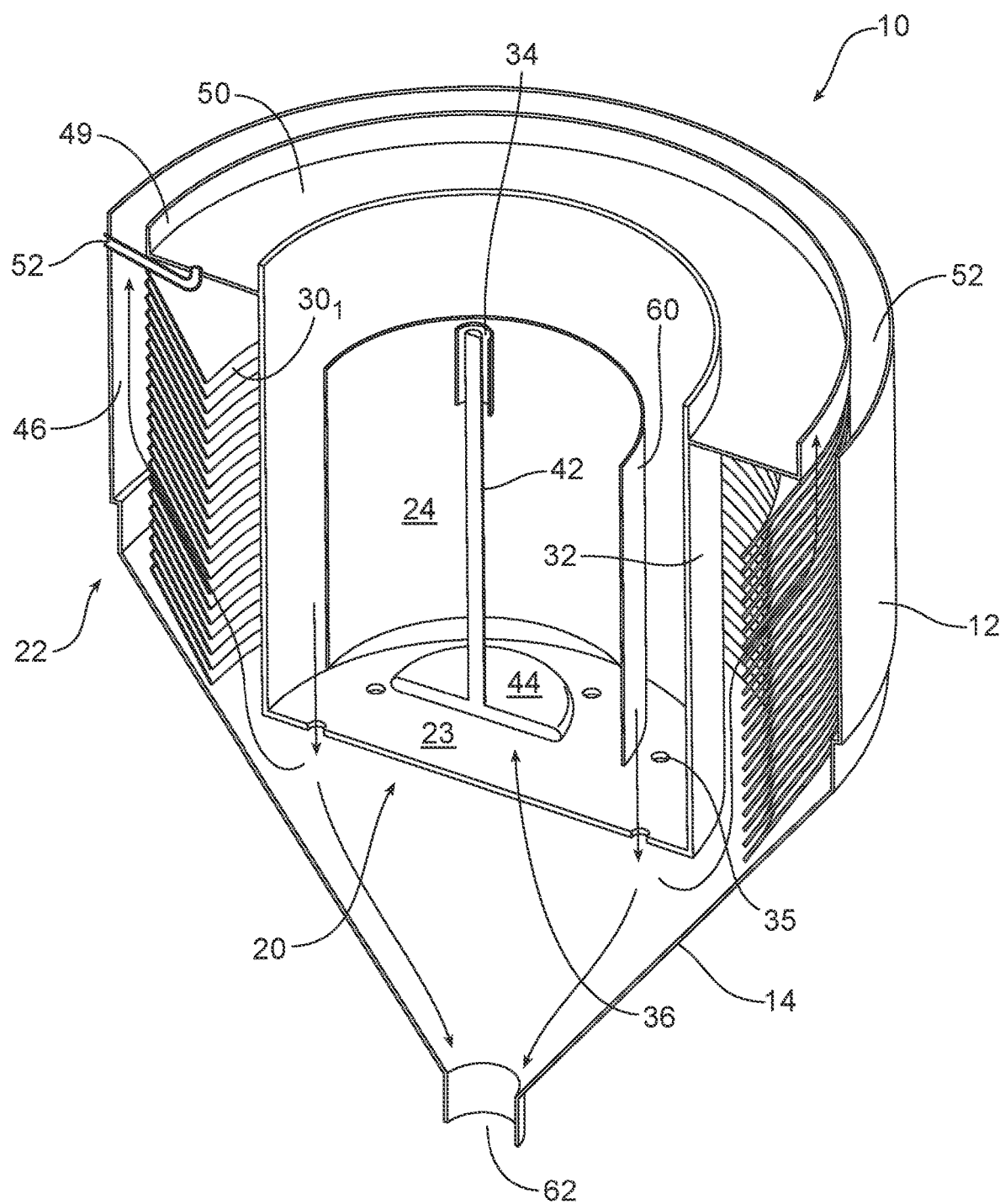
FIG. 6 is a perspective view of the cross-sectioned apparatus illustrated in FIG. 5C.

More particularly, as best illustrated in FIG. 6, this embodiment of the single stage clarifier and mixing assembly 10 includes a housing 12 having an at least partially frustoconical sidewall 14. A mixing section 20 is provided within the housing 12. That mixing section 20 includes a cylindrical outer sidewall 21 and a bottom wall 23 defining a mixing chamber 24. An inlet 34, adapted for delivering an inlet stream to the mixing chamber 24, is provided at an upper end thereof (note open top) and an outlet in the form of ports 35 is provided in the bottom wall 23. The outlet ports 35 may comprise a plurality of ports radially arrayed along an arc as shown or may assume some other shape or even a random arrangement.

A cylindrical baffle 60 may be provided in the mixing chamber 24 spaced from the outer sidewall 21. The cylindrical baffle 60 may have a first radius of curvature $R_1$ and the outlet ports 35 may be oriented on an arc having a second radius of curvature $R_2$ where $R_1$<$R_2$. In other embodiments, vertical baffles 56 may be provided.

An agitator 36 is provided in the mixing section 20. The agitator 36 is adapted for mixing the inlet stream delivered to the mixing chamber 24 through the inlet 34. The agitator 36 includes a drive shaft 42 and an impeller 44 carried on the drive shaft. A drive motor, not shown, turns the drive shaft 42 and the impeller 44.

The single stage clarifier and mixing assembly 10 also includes a clarifier section 22 within the housing 12. The clarifier section 22 extends concentrically around the mixing section 20.

The clarifier section 22 includes a plurality of plates $26_1$-$26_n$ that are nested together and define a plurality of flow passageways $28_1$-$28_n$ wherein the lowermost ends $30_1$-$30_n$ thereof open into an axial passageway 32 extending through the clarifier section along and concentrically around the mixing section 20. The uppermost ends $48_1$-$48_n$ of the intervening flow passageways $28_1$-$28_n$ open into the clarified liquid chamber 46 extending concentrically around the assembly 10 between the frustoconical plates $26_1$-$26_n$ and the housing sidewall 14. The clarified liquid in the clarified liquid chamber 46 spills over the weir 49 and is delivered by the gutter 50 to a first outlet 52 provided at the top of the assembly 10. A second outlet 62 is provided at the bottom of the assembly.

In operation, an inlet stream, such as a slurry, is delivered to the mixing chamber 24 through the open top inlet 34. The agitator 36 provides the mixing action to maintain any solids in the mixing chamber 24 in suspension. The slurry exits the mixing chamber 24 through the outlet ports 35 provided in the bottom wall 23 and enters the lower portion 37 of the clarifier section. The heavier, solid-laden portion of the slurry flows downward along the frustoconical sidewall 14 toward the second outlet 62 while the lighter, relatively solid free portion of the slurry is forced upward through the intervening flow passageways $28_1$-$28_n$ between the plates $26_1$-$26_n$. There lamella separation occurs and remaining solids in the rising slurry flow down the surface of the plates $26_1$-$26_n$ and then drop toward the second outlet 62. At the same time, the now clarified liquid exits the uppermost ends $48_1$-$48_n$ of the intervening flow passageways $28_1$-$28_n$, entering the clarified liquid chamber 46 before flowing over the weir 49 and being delivered by the gutter 50 to the first or clarified liquid outlet 52.

Figure 7:
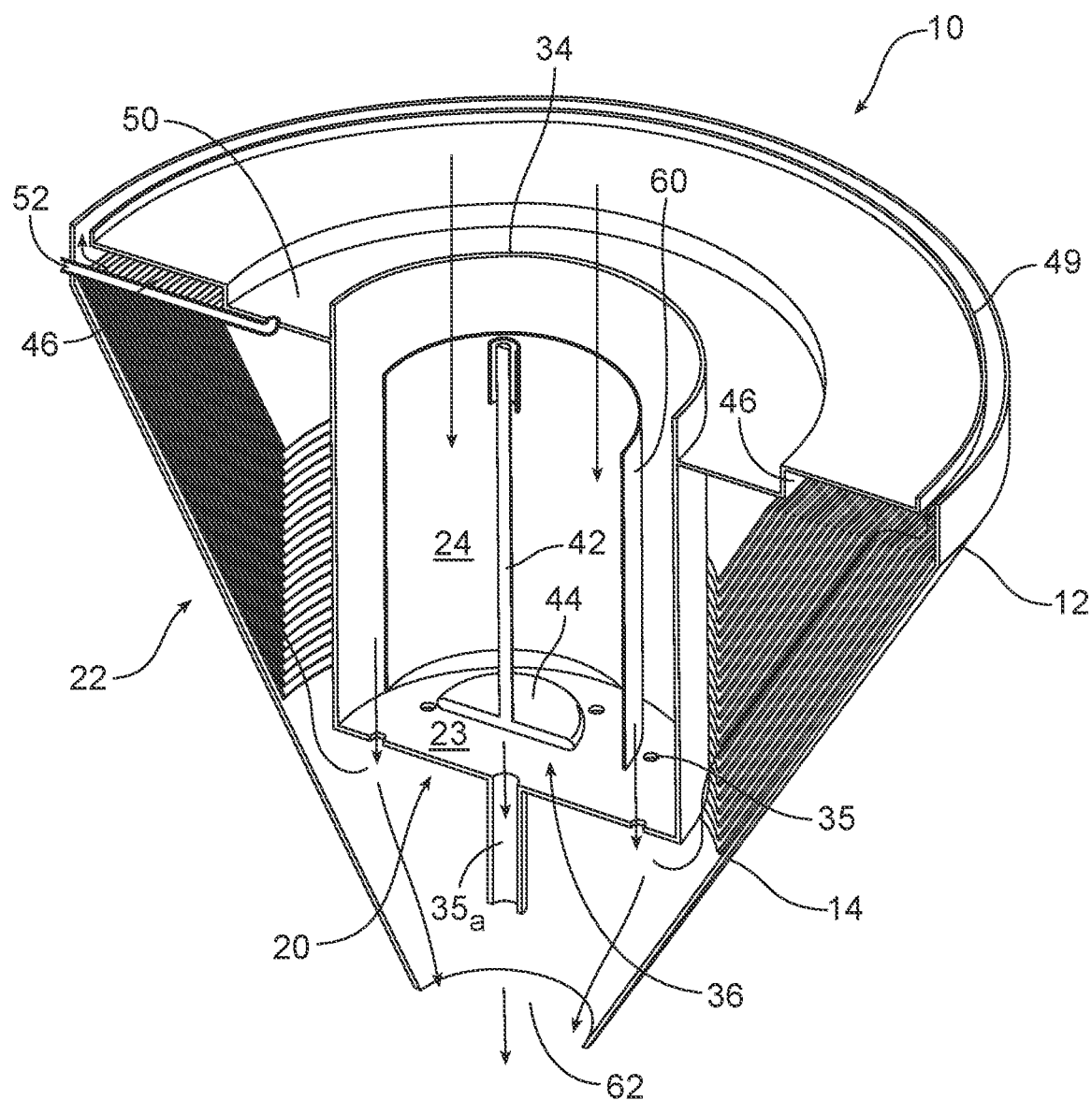
FIG. 7 is a perspective view of the cross-sectioned apparatus illustrated in FIG. 5D.

The embodiment of the single stage clarifier and mixing assembly 10 illustrated in FIG. 7 differs from that of the embodiment illustrated in FIG. 6 in several ways. First, the outlet 35 provided in the bottom wall 23 of the mixing section 20 now includes not only the ports provided in the FIG. 6 embodiment but also the additional port 35a aligned with the drive shaft 42 along the central axis A of the housing 12. In some embodiments, port 35a may replace outlet 35. Second, the clarified chamber 46 at the uppermost ends $48_1$-$48_n$ of the flow passageways $28_1$-$28_n$ overlies the uppermost ends rather than extending concentrically around the frustoconical plates $26_1$-$26_n$ inside the sidewall 14.

The action arrows illustrate the flow of the inlet stream into the mixing chamber and the movement of the slurry through mixing section 20 and the clarifier section 22 with the clarified liquid exiting the first outlet 52 and the solid laden slurry exiting the second outlet 62.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An apparatus, comprising:
    a first single stage clarifier and mixing assembly including:
    a housing;
    a mixing section within the housing, the mixing section including a cylindrical outer wall, a mixing chamber having an inlet and a mixing section outlet;
    a clarifier section within the housing and extending concentrically around the cylindrical outer wall of the mixing section; and
    an agitator adapted for mixing the inlet stream in the mixing chamber wherein the clarifier section includes a plurality of plates that are nested together and define a plurality of intervening flow passageways wherein lowermost ends of the plurality of intervening flow passageways open into an axial passageway extending through the clarifier section along and around the mixing section.

2. The apparatus of claim 1, wherein the agitator includes a drive shaft and an impeller carried on the drive shaft.

3. The apparatus of claim 2, further including a baffle spaced inside the outer wall.

4. The apparatus of claim 3, wherein the mixing section outlet is provided in a wall of the mixing section below a lowermost plate.

5. The apparatus of claim 4, wherein uppermost ends of the plurality of intervening flow passageways open into a clarified liquid chamber extending concentrically around the apparatus between the plurality of plates and the housing.

6. The apparatus of claim 5, wherein the clarified liquid chamber is in communication with a first outlet.

7. The apparatus of claim 6, wherein the housing is at least partially frustoconical in shape and the first outlet for a first outlet stream is provided at a top end thereof while a second outlet for a second outlet stream is provided at a bottom end thereof.

8. The apparatus of claim 7, further including a second single stage clarifier and mixing assembly having a structure identical to the first single stage clarifier and mixing assembly, said second single stage clarifier and mixing assembly being located downstream from said first single stage clarifier and mixing assembly.

9. The apparatus of claim 8, further including a third single stage clarifier and mixing assembly having a structure identical to the first single stage clarifier and mixing assembly, said third single stage clarifier and mixing assembly being located downstream from said second single stage clarifier and mixing assembly.

10. The apparatus of claim 9, wherein (a) a first outlet stream from a first outlet of said second single stage clarifier and mixing assembly is delivered through the inlet to the mixing chamber of the first single stage clarifier and mixing assembly and (b) a first outlet stream from a first outlet of said third single stage clarifier and mixing assembly is delivered through an inlet to the mixing chamber of said second single stage clarifier and mixing assembly.

11. The apparatus of claim 10, wherein (a) the second outlet stream from the second outlet of the first single stage clarifier and mixing assembly is delivered through the inlet to said mixing chamber of said second single stage clarifier and mixing assembly and (b) a second mixing section outlet stream from a second outlet of the second single stage clarifier and mixing assembly is delivered through the inlet to said mixing chamber of said third single stage clarifier and mixing assembly.

12. The apparatus of claim 3, wherein the mixing section outlet further includes an opening in a bottom wall aligned with the drive shaft along a central axis of the housing.

13. The apparatus of claim 12, wherein uppermost ends of the plurality of intervening flow passageways open into a clarified liquid chamber overlying the uppermost ends.

14. The apparatus of claim 13, wherein the clarified liquid chamber is in communication with a first outlet.

15. The apparatus of claim 14, wherein the housing is substantially frustoconical in shape and the first outlet for a first outlet stream is provided at a top end thereof while a second outlet for a second outlet stream is provided at a bottom end thereof.

* * * * *